United States Patent
Weston et al.

(10) Patent No.: US 7,576,624 B2
(45) Date of Patent: Aug. 18, 2009

(54) SYSTEM AND METHOD FOR EXTENDING UNIVERSAL BUS LINE LENGTH

(75) Inventors: Lance Weston, East Northport, NY (US); Tony T. Li, Roslyn Heights, NY (US); John J. Ryan, Seaford, NY (US)

(73) Assignee: Honeywell International Inc., Morristown, NJ (US)

( * ) Notice: Subject to any disclaimer, the term of this patent is extended or adjusted under 35 U.S.C. 154(b) by 663 days.

(21) Appl. No.: 11/434,458

(22) Filed: May 15, 2006

(65) Prior Publication Data
US 2007/0170953 A1   Jul. 26, 2007

Related U.S. Application Data

(60) Provisional application No. 60/755,624, filed on Dec. 30, 2005.

(51) Int. Cl.
*H04B 3/04* (2006.01)
*H04L 25/03* (2006.01)

(52) U.S. Cl. ..................... 333/20; 333/28 R
(58) Field of Classification Search ............ 333/20
See application file for complete search history.

(56) References Cited

U.S. PATENT DOCUMENTS

| | | | |
|---|---|---|---|
| 5,910,731 A | 6/1999 | Polczynski | |
| 6,525,569 B1 | 2/2003 | Leon | |
| 6,531,931 B1 * | 3/2003 | Benyamin et al. | 333/18 |
| 6,542,540 B1 * | 4/2003 | Leung et al. | 375/232 |
| 6,963,218 B1 | 11/2005 | Alexander et al. | |

\* cited by examiner

*Primary Examiner*—Benny Lee
*Assistant Examiner*—Alan Wong
(74) *Attorney, Agent, or Firm*—Husch Blackwell Sanders Welsh & Katz

(57) ABSTRACT

A system and method for recovering a high frequency component of a slew rate controlled signal propagating along a transmission line enables the high frequency component to be recovered after being lost because of slew rate control and transmission line low pass filtering effects. The system includes a wave shaping circuit for receiving and shaping the slew rate controlled signal to recover the high frequency component. The method includes receiving the slew rate controlled signal, and recovering the high frequency component by shaping the slew rate controlled signal to produce a shaped signal, where the shaped signal includes the received slew rate controlled signal and the high frequency component.

10 Claims, 3 Drawing Sheets

SYSTEM AND METHOD FOR EXTENDING UNIVERSAL BUS LINE LENGTH

CROSS REFERENCE TO RELATED CASE

This claims priority to and the benefit of Provisional U.S. patent application Ser. No. 60/755,624, filed Dec. 30, 2005, the entirety of which is hereby incorporated herein by reference.

TECHNICAL FIELD

The present invention relates generally to extending a communication data bus transmission line length, and more particularly to extending a modified RS-485 serial communication data bus transmission line length from 6000 feet to 14,000 feet.

BACKGROUND INFORMATION

A modified RS-485 serial communication bus, such as the IntelliBus™, for example, has a transmission line length of up to approximately 6,000 feet. Serial communication buses of this type transmit a differential signal, are topology independent (i.e., all topologies of wiring are compatible), do not require termination at either the transmitting or the receiving ends and have a maximum data transmission rate of 38.4 KBaud.

Typically, the transmitted differential signal travels along the transmission line at 0.15 nanoseconds per foot. The transmitted signal reaches the end of the transmission line and is reflected back before the end of the rise or fall time of the originally transmitted signal. This signal reflection disrupts the transmitted signal. To compensate for the signal reflection, the rise and fall times of the transmitted signal are altered by adjusting the RC time constant of the transmitting circuit (i.e., control the slew rate of the transmitted signal). However, adjusting the RC time constant results in a portion of the high frequency component of the transmitted signal being filtered (lost) and the maximum data transmission rate being limited to 38.4 KBaud. Further, the transmission line also acts as a low-pass filter, which further filters the high frequency component of the transmitted signal. As the transmission line length increases, more of the high frequency component of the transmitted signal is lost. Thus, any data in the high frequency portion of the transmitted signal is also lost. The maximum transmission line length is therefore determined by the maximum allowable loss of the high frequency component (of the transmitted signal) that will still allow the data to be received. Currently, the transmission line length of a modified RS-485 serial communication bus, such as the IntelliBus™, is limited to approximately 6,000 feet.

SUMMARY OF THE INVENTION

The present invention relates generally to extending a serial communication data bus transmission length, and more particularly to extending a modified RS-485 serial communication data bus transmission length from 6000 feet to 14,000 feet.

In one aspect, the invention involves a method for recovering a high frequency component of a slew rate controlled signal propagating along a transmission line where the high frequency component is lost from slew rate control and transmission line low pass filtering effects. The method includes receiving the slew rate controlled signal, and recovering the high frequency component by shaping the slew rate controlled signal to produce a shaped signal where the shaped signal includes the received slew rate controlled signal and the high frequency component.

In one embodiment, the method further includes outputting the shaped signal for use by other circuitry. In another embodiment, shaping the slew rate controlled signal includes producing the inverse of the slew rate controlled transmitted signal. In still another embodiment, shaping the slew rate controlled signal includes increasing the high frequency component of the received slew rate controlled signal.

In another aspect, the invention involves a system for recovering a high frequency component of a slew rate controlled signal propagating along a transmission line where the high frequency component is lost from slew rate control and transmission line low pass filtering effects. The system includes a wave shaping circuit for receiving and shaping the slew rate controlled signal to recover the high frequency component.

In one embodiment, the system further includes a differential comparator for receiving output of the wave shaping circuit. In another embodiment, the system further includes a universal asynchronous receiver/transmitter for receiving output from the differential comparator. In still another embodiment, the wave shaping circuit shapes the slew rate controlled signal by producing the inverse of the slew rate controlled signal. In yet another embodiment, the wave shaping circuit shapes the slew rate controlled signal by increasing the high frequency component of the slew rate controlled signal. In other embodiments, the transmission line is between zero and 14,000 feet long.

The foregoing and other objects, aspects, features, and advantages of the invention will become more apparent from the following description and from the claims.

BRIEF DESRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

The present invention provides a system and method for extending a modified RS-485 serial communication data bus transmission line length from 6,000 feet to 14,000 feet by shaping a slew rate controlled signal to produce a waveform (shaped signal) that includes any lost high frequency component of the slew rate controlled signal due to the slew rate control and transmission line low pass filtering effects.

Figure 1:
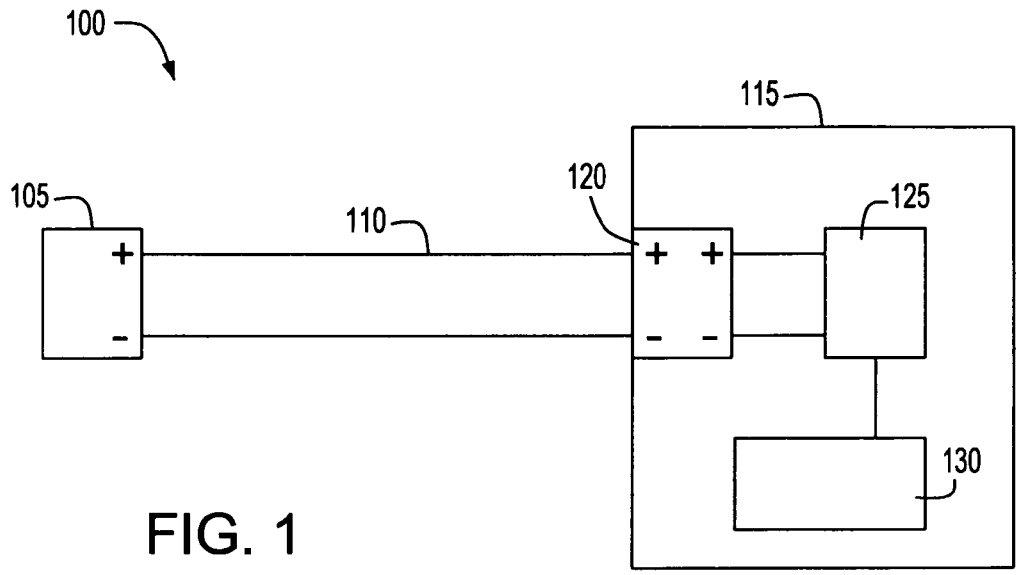
FIG. 1 is an illustrative schematic diagram of a modified 485 serial communication bus employing a pre-compensation circuit, according to one embodiment of the invention.

Referring to FIG. 1, in one embodiment, a schematic diagram of a modified 485 serial communication bus 100 is shown. The modified 485 serial communication bus 100 includes a transmitting/driver circuit 105, a transmission line 110, and a receiver circuit 115. The receiver circuit 115 includes a pre-compensation (wave shaping) circuit 120, a differential comparator 125, and a universal asynchronous receiver/transmitter (UART) 130.

In a preferred embodiment, the modified 485 serial communication bus 100 is an Intellibus™ serial communication bus with a maximum data transmission rate of 34.8 KBaud.

The present invention enables high frequency signal component recovery for a transmission line length of zero to 14,000 feet.

In other embodiments, the modified 485 serial communication bus 100 can be any serial communication bus that transmits a slew rate controlled (i.e., the RC time constant is adjusted to compensate for transmission line reflection effects) differential signal, is topology independent (i.e., all topologies of wiring are compatible), and does not require termination at either the transmitting or the receiving ends. In still other embodiments, other data transmission rates can be used.

Figure 2:
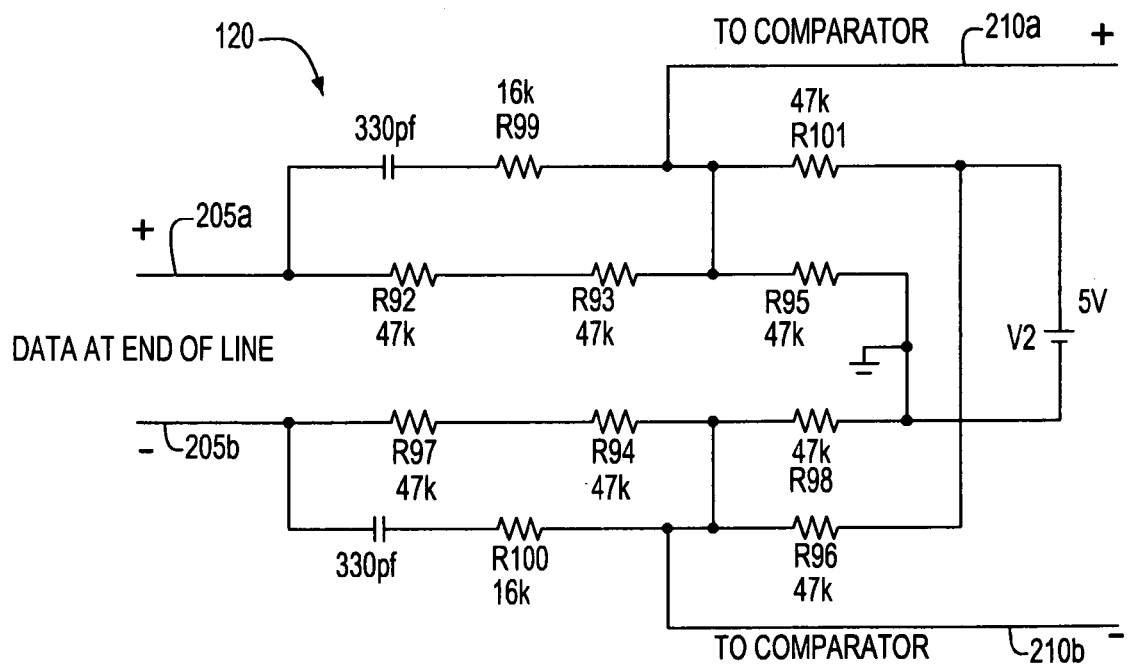
FIG. 2 is an illustrative schematic diagram of a pre-compensation circuit, according to one embodiment of the invention.

Referring to FIG. 2, a schematic diagram of the pre-compensation (wave shaping) circuit 120 is shown. The values of the discrete components used to construct the pre-compensation circuit 120 are chosen based on the characteristics of the transmission line 110, which include transmission line length (i.e., zero to 14,000 feet) and transmission line baud rate (i.e., 38.4 Kbaud). For other baud rates, the values of discrete components used in the pre-compensation circuit 120 would be different and determined by tuning the pre-compensation circuit 120 to function optimally with the transmission line 110 at a chosen baud rate.

The pre-compensation circuit 120 receives the differential transmitted differential signal at differential inputs 205a and 205b and shapes the differential transmitted signal by producing the inverse of the differential transmitted signal (in the frequency domain) to increase the high frequency component of the differential transmitted signal in order to allow any data in the high frequency component to be recovered.

Figure 3:
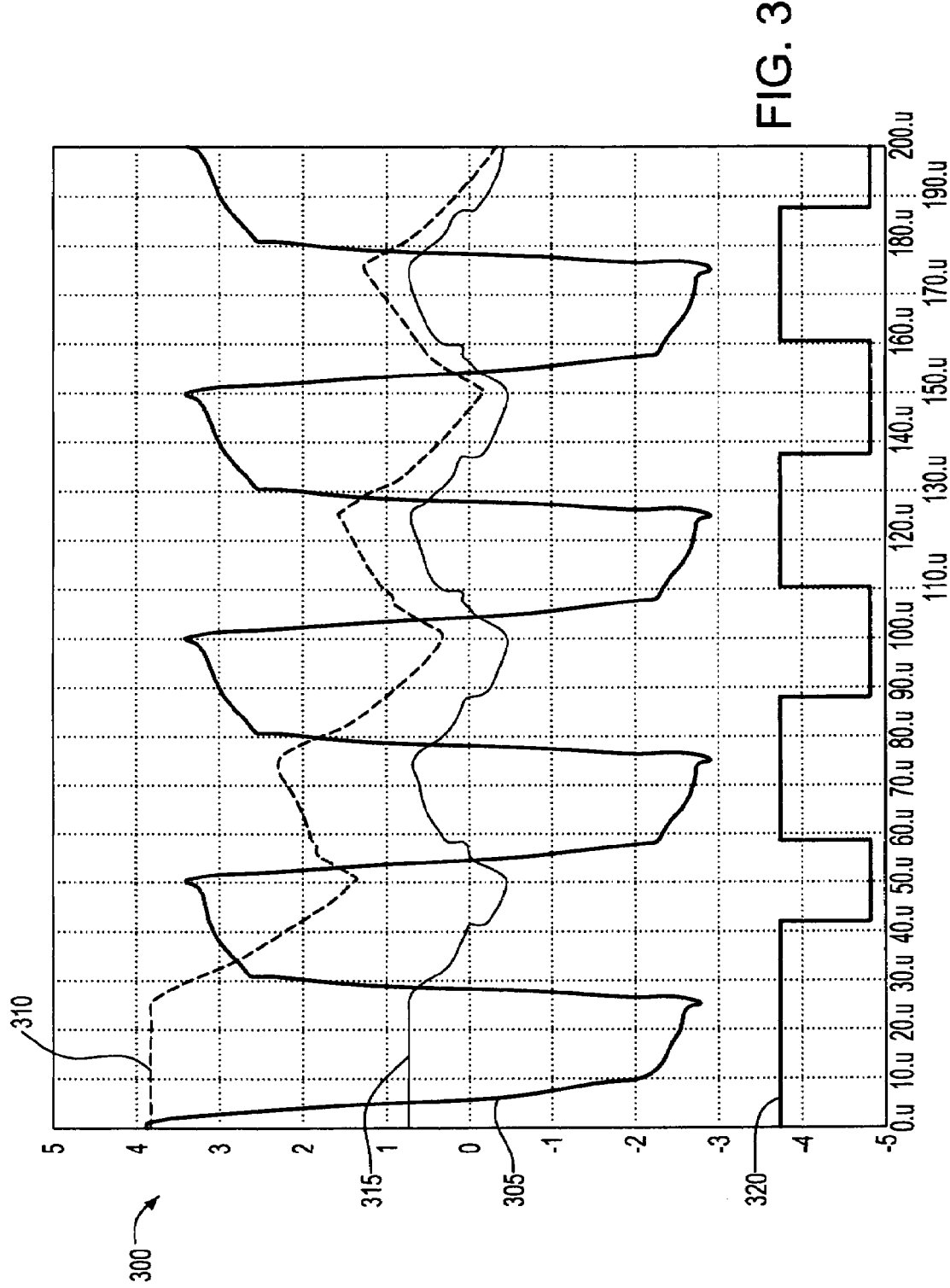
FIG. 3 is an illustrative graph of a transmitted and received signal, according to one embodiment of the invention.

Referring to FIG. 3, a graph 300 of a transmitted differential and a received differential signal is shown. The graph 300 includes plot of a transmitted differential signal voltage 305, a plot of a received differential signal voltage 310, and a plot of a shaped differential signal 315, which has passed through the pre-compensation circuit 120. The graph 300 also includes a plot of a data signal 320.

Referring to FIGS. 1 and 3, in operation, the slew rate controlled differential signal 305 (with a transmission rate of 38.4 KBaud) is transmitted from the transmitting/driver circuit 105. The transmitted differential signal 305, which has already lost a portion of its high frequency component due to the low pass filtering effects of the slew rate control, propagates along the transmission line 110 to the receiver circuit 115. At the receiver circuit 115, the received differential signal 310 has lost an additional portion of its high frequency component due to the low pass filtering effects of the transmission line 110. At this point, any data that is part of the lost high frequency component is also lost.

Thereafter, the received differential signal 310 passes through the pre-compensation circuit 120, which shapes the received differential signal 310 to produce the shaped differential signal 315. The shaped differential signal 315 is the inverse of the received differential signal 310 (i.e., the transmitted differential signal 305 after the additional high frequency loss from transmission line low pass filtering). By producing the shaped differential signal 315, the lost high frequency component of the transmitted differential signal 305 is recovered and therefore, any data in the high frequency component is also recovered.

As shown on the graph 300, a portion of the received differential signal 310 does not cross zero for several data bits (plot 320) because of the high frequency filtering effects. The data bits in this portion of the received differential signal 310 (i.e., the data 320 before 140 microseconds) cannot be decoded and will be lost. However, after the received differential signal 310 is shaped to produce the shaped differential signal 315, the entire waveform oscillates around zero, which allows the data in the high frequency component to be decoded.

The shaped differential signal 315 is then passed to the differential comparator 125. The output of the differential comparator is then passed to the UART 130. The output of the UART 130 is the data signal 320.

Figure 4:
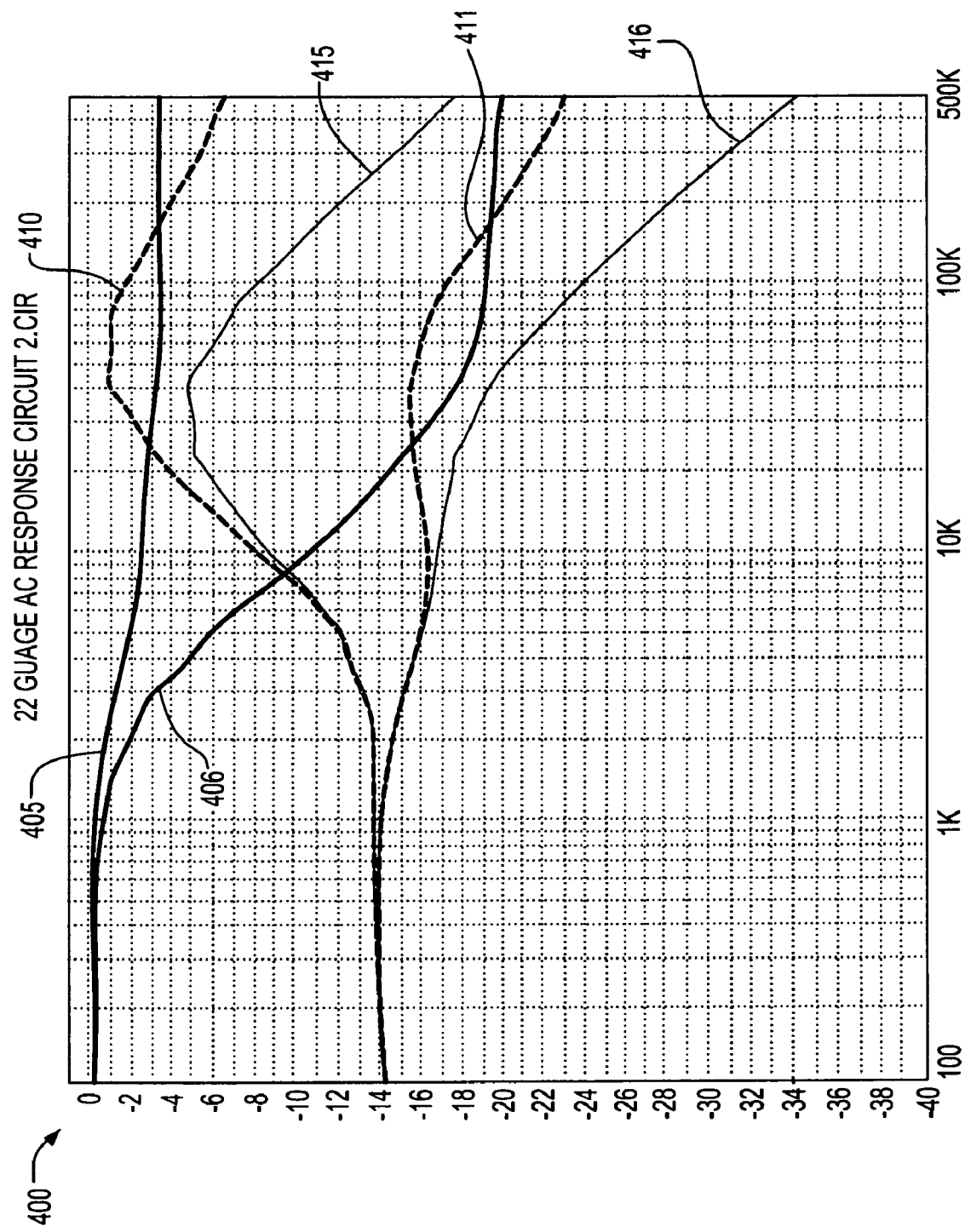
FIG. 4 is an illustrative graph of the AC response of the transmission line at 2,000 and 14,000 feet, according to one embodiment of the invention.

Referring to FIG. 4, in one embodiment, a graph 400 of the AC response of the transmission line 110 is shown. Plot 405 is the AC response of the transmission line 110 at 2,000 feet and plot 406 is the AC response of the transmission line 110 at 14,000 feet. Plot 410 is the signal after shaping by pre-compensation circuit 120 at 2,000 feet and plot 411 is the signal after shaping by pre-compensation circuit 120 at 14,000 feet. Plot 415 is the signal after shaping by pre-compensation circuit 120 with additional signal rolloff to eliminate radio frequencies and other noise at 2,000 feet and plot 416 is the signal after shaping by pre-compensation circuit 120 with additional signal rolloff to eliminate radio frequencies and other noise at 14,000 feet.

The system and method of the present invention can effectively recover any lost high frequency component of a slew rate controlled signal due to the slew rate control and transmission line low pass filtering effects for a transmission line length of up to 14,000 feet.

Variations, modifications, and other implementations of what is described herein may occur to those of ordinary skill in the art without departing from the spirit and scope of the invention. Accordingly, the invention is not to be defined only by the preceding illustrative description.

What is claimed:

1. A method for recovering a high frequency component of a slew rate controlled signal propagating along a transmission line, the high frequency component being lost from slew rate control and transmission line low pass filtering effects, the method comprising:

receiving the slew rate controlled signal; and recovering the high frequency component by shaping the slew rate controlled signal to produce a shaped signal, the shaped signal comprising the received slew rate controlled signal and the high frequency component.

2. The method of claim 1 further comprising outputting the shaped signal for use by other circuitry.

3. The method of claim 1 wherein shaping the slew rate controlled signal comprises producing the inverse of the slew rate controlled transmitted signal.

4. The method of claim 1 wherein shaping the slew rate controlled signal comprises increasing the high frequency component of the received slew rate controlled signal.

5. A system for recovering a high frequency component of a slew rate controlled signal propagating along a transmission line, the high frequency component being lost from slew rate control and transmission line low pass filtering effects, the system comprising:

a wave shaping circuit for receiving and shaping the slew rate controlled signal to recover the high frequency component.

6. The system of claim 5 further comprising a differential comparator for receiving output of the wave shaping circuit.

7. The system of claim 6 further comprising a universal asynchronous receiver/transmitter for receiving output from the differential comparator.

8. The system of claim 5 wherein the wave shaping circuit shapes the slew rate controlled signal by producing the inverse of the slew rate controlled signal.

9. The system of claim 5 wherein the wave shaping circuit shapes the slew rate controlled signal by increasing the high frequency component of the slew rate controlled signal.

10. The system of claim 5 wherein the transmission line is between zero and 14,000 feet long.

* * * * *